J. H. CASTONA.
PROCESS OF OBTAINING TURPENTINE AND RESIN FROM RESINOUS WOODS.
APPLICATION FILED MAY 7, 1912.
1,149,027.
Patented Aug. 3, 1915.
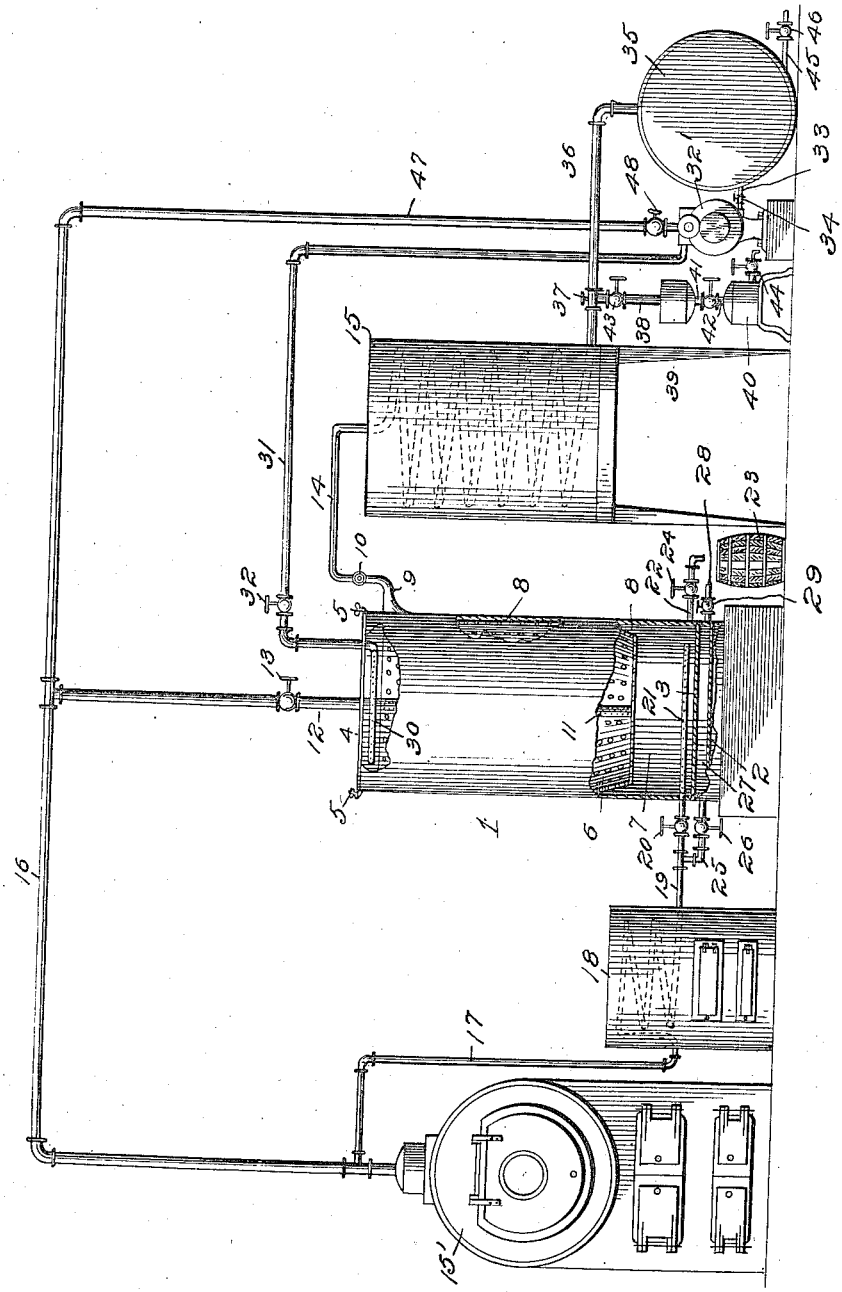
Witnesses
Inventor
J. H. Castona
By Victor J. Evans
Attorney

UNITED STATES PATENT OFFICE.

JOHN H. CASTONA, OF MOSS POINT, MISSISSIPPI, ASSIGNOR TO CASTONA IMPROVED PROCESS CO., OF GULFPORT, MISSISSIPPI, A CORPORATION OF SOUTH DAKOTA.

PROCESS OF OBTAINING TURPENTINE AND RESIN FROM RESINOUS WOODS.

1,149,027.   Specification of Letters Patent.   Patented Aug. 3, 1915.

Application filed May 7, 1912. Serial No. 695,800.

*To all whom it may concern:*

Be it known that I, JOHN H. CASTONA, a citizen of the United States, residing at Moss Point, in the county of Jackson and State of Mississippi, have invented new and useful Improvements in Processes of Obtaining Turpentine and Resin from Resinous Woods, of which the following is a specification.

This invention relates to a process of obtaining turpentine and resin from resinous woods.

Heretofore, in the process of employing solvents for the purpose described, it has been the general practice to transfer the extracted turpentine and resin with the solvent from the extractor to a still, in which the products and solvent are separated by the ordinary process of distillation. This is a long and tedious process, requiring an elaborate plant and too expensive to be employed in some sections or for operations on a small scale, as in the utilization of waste wood from saw-mills and the like.

The object of the present invention is to provide a process of extraction which is simple, cheap and effective, which obviates the necessity of employing an expensive plant, which enables the products and solvent to be separately discharged and collected in a highly refined state and the solvent to be recovered for further use, and which obviates the use of a refining or distilling apparatus in separating the products, solvent and water of condensation from each other.

A further object of the invention is to provide a process of extraction which may be efficiently operated without danger by attendants of ordinary intelligence, and which may be employed with profit in the extraction of turpentine and resin from waste material.

The accompanying drawing shows in side elevation, partly in section, a type of apparatus adapted for carrying my process into practical effect.

In the drawing, 1 designates an extractor comprising a cylindrical vessel provided with spaced bottom heads 2 and 3, and a removable lid or cover 4 adapted to be held in closed position by suitable clamping devices 5. Suitably supported within the vessel 1 is a perforated basket or cage 6, which terminates above the head 3 to provide an intermediate collection space or chamber 7. This basket or cage is of less diameter than the vessel to provide an intermediate space or passage 8 for the discharge of the steam and volatile constituents through an outlet 9, provided with a controlling valve 10. The cage is adapted to hold the charge of wood to be treated, which is in a suitable comminuted condition, and which may be inserted into and removed from the extractor vessel when the cover 4 is thrown back or removed.

Supported by and extending centrally within the basket or cage 6 is a perforated steam distributing pipe 11, which communicates at its upper end with a pipe 12 extended through the cover 4 and provided with a controlling valve 13. Through these pipes steam is introduced into the cage for diffusion throughout the mass of the wood, whereby the volatile constituents of the wood are liberated together with the resin, such volatile constituents discharging through the outlet 9, while the liquid resin passes through the bottom of the cage into the collection space 7. The outlet 9 communicates through the pipe 14 with a condenser 15, of any suitable construction, in which the turpentine, vapor and solvent are condensed, while the pipe 12 communicates through a pipe 16 with a suitable boiler or steam generator 15', steam being supplied to the pipe 11 from said generator at a pressure of about 50 pounds, whereby the turpentine is evaporated from the wood in a highly refined state and of a water white color. From the pipe 16 leads a branch steam supply pipe 17 communicating with a coil within a superheater 18, wherein the steam is superheated to the desired degree without increasing its pressure, and from said coil extends a pipe 19, provided with a controlling valve 20, and connected with a perforated heating coil 21 within the collection space or chamber 7. From the said space or chamber 7 leads a drain pipe 22, for the discharge of the resin and water of condensation passing out therewith into a barrel or other suitable receptacle 23, said pipe being provided with a controlling valve 24. A pipe 25 having a controlling valve 26 leads from the pipe 19 into one side of a heating chamber 27 formed between the heads 2 and 3. Communicating with an opposite side of said chamber 27 is a pipe 28, having a controlling valve 29, through which pipe any water of condensation remaining in said chamber may be discharged. This pipe is, however, primarily provided to permit a certain proportion of the steam supplied through the pipe 25 to the chamber 27 to escape in order to maintain a predetermined temperature and pressure therein.

Arranged within the top of the extractor 1 in proximity to the top of the cage is a spray pipe or coil 30, through which a suitable solvent, such as a light hydrocarbon, may be introduced, to circulate throughout the mass of wood and assist in extracting the turpentine and resin. This coil communicates with a pipe 31, having a controlling valve 32, which pipe extends at its delivery end through the cover 4 and communicates at its opposite end with the outlet of a pump 32'. The inlet of this pump is connected by means of a pipe 33 having a controlling valve 34, with a solvent storage tank 35, from which the liquid is drawn by the action of the pump and forced through the pipe 31 to the coil 30. The tank 35 communicates with the condenser 15 through a pipe 36 having a controlling valve 37 therein, and at a point between said valve and the condenser said pipe 36 communicates through a pipe 38 with a separator comprising a pair of superposed receptacles 39 and 40 connected by a conductor 41 provided with a retaining valve 42. The pipe 38 is provided with a controlling valve 43, and the vessel 40 is provided with a drain valve 44. In this separator the turpentine is separated from the water of condensation by gravity, the water being drawn off from the vessel 39 into the vessel 40 at intervals through the connection 41 and finally discharged from the vessel 40 through the valve 44, through which the turpentine is also withdrawn after the water has been discharged. The tank 35 is provided with a draw off pipe 45 having a valve 46 therein, through which any water contained in said tank and passing thereto with the solvent may be discharged. The pump is supplied with steam from the generator through a pipe 47 provided with a controlling valve 48 and connected with the pipe 16.

The process is carried out as follows: The crate of comminuted wood having been placed within the extractor and the lid 4 clamped tight, the valve 13 is opened for the admission of steam through the pipe 11, by which the steam is caused to pass uniformly throughout the mass of the wood, whereby the turpentine is vaporized and discharged with the steam through the outlet 9 into the condenser 15, where the turpentine and steam are condensed. As soon as steam is admitted through the pipe 11, the valve 26 is opened to admit the steam into the superheating chamber 27, and the valve 29 partially opened to allow sufficient exhaust of such steam to maintain a constantly uniform temperature and pressure, the bottom of the extractor being thereby heated to a high degree. As the wood is a non-conductor of heat and cold at the outlet, a suitable quantity of the steam supplied through the pipe 11 will condense until the wood is thoroughly heated. This water of condensation flows downward into the chamber 7, where it is heated and vaporized by contact with the superheated bottom 3, and thence passes out with the turpentine vapor to the condenser 15. By this means the retention of a body of water in the bottom of the extractor, tending to reduce its temperature and interfere with the heating of the wood to the necessary degree, is avoided, while at the same time, a uniform temperature is maintained throughout the extractor.

In practice, a steam pressure of about 50 pounds is employed, as it is found that the turpentine will be evaporated from the wood at this pressure within a minimum period of time, usually from thirty to forty-five minutes, and the turpentine so obtained is water white in color and in a highly refined state. When the wood is subjected to an exceedingly high temperature and pressure an inferior quality of product is obtained, due probably to the breaking up of the turpentine vapor into its constituent gases. At the end of the period mentioned a small percentage of turpentine may remain with the resin in the wood, but is later wholly extracted by the further carrying out of the process. At the end of the period mentioned a small percentage of turpentine, sometimes called pine oil, which is slightly heavier and less volatile than the body of turpentine first driven from the wood, may be left remaining in the wood. This requires a higher degree of heat to vaporize it. Therefore, as soon as all the lighter turpentine has been vaporized, superheated steam is admitted to the extractor through coil 21 by opening valve 20 whereby the wood is heated to a higher degree sufficient to volatilize the pine oil, which vapor discharges with the steam through outlet 9 and pipe 14 to the condenser. The action of the steam at this stage of the process has the effect of refining the cruder turpentine so that at all times a superior quality of turpentine will be obtained. In this operation of extracting the pine oil, a separate receiver or separator is preferably employed, which is applied in place of the receiver or separator into which the lighter volatile oils first extracted are conducted, although by the exercise of proper care one and the same receiver for the turpentine and pine oil may be used. By connecting two receivers with the pipe 36, through suitable branch pipes and valves, such receivers may be alternately used, thus avoiding the actual necessity as applying and removing the receivers as occasion demands. The superheated steam is advantageously supplied at a temperature of about 185° C., as at this temperature the pine oil will distil freely without injury to the rosin or the wood, unless the period of distillation is unnecessarily prolonged. Preferably the valve 10 is partially closed as soon as the superheated steam is admitted to the coil 21, so as to maintain a low temperature, of from 10 to 15 lbs., in the extractor. This causes the superheated steam to more thoroughly penetrate the wood and more freely and quickly volatilize the pine oil. As soon as the flow of pine oil from the extractor to the condenser ceases, the valves 13 and 20 are closed to cut off the supply of steam through the pipes 11 and 19, and the pump 32' set in action and the valve 32 opened for the supply of solvent from the tank 35 to the extractor. This solvent is pumped into the extractor until the latter is about one-half full; then the pump is stopped and the valve 32 closed. The solvent thus supplied percolates down through the mass of wood and upon reaching the superheated bottom 3 flashes into vapor.

In its passage through the wood, the solvent extracts the resin and upon evaporating, leaves the resin in the chamber 7, while it passes off through the outlet 9 and pipe 14 to the condenser, in which it is liquefied, and then returned to tank 35 for further use. The action of boiling or vaporizing the solvent causes it to more thoroughly and quickly penetrate the pores of the wood and dissolve out the resin, which flows through the wood to the collection space 7. As the solvent is finally evaporated a portion of it will remain in the wood as well as a percentage of the resin. In order to collect this residue of the solvent and resin, the valve 13 is again opened after the evaporated portion of the solvent has been condensed to admit steam through the pipe 11 into the crate whereby the remainder of the solvent and resin is driven out, the final portion of rosin falling into space 7, while the solvent passes to the condenser 15 where it is liquefied and passes with any water contained therewith through pipe 36, into tank 35, from which the water is drawn off through the valve 46 leaving a pure body of solvent for further use. The dissolved and heated resin leaving the wood with the solvent is driven by the steam pressure to the outside of the crate, whence it flows into the collection chamber 7, in which all of the resin is collected ready for discharge. As soon as the last of the solvent is extracted and expelled, the supply of steam through the extractor is entirely cut off and the resin withdrawn through the pipe 22 into the barrel or receptacle 23. If desired, however, while the resin is being withdrawn, and the crate is being removed and refilled or another filled crate inserted in its place, to allow the superheated steam to continue entering the chamber 27 in order to keep said chamber and the bottom of the extractor from being chilled, whereby the process of heating the massed wood in the ensuing extracting action will be expedited and facilitated. As a result of the described method of extracting and separating the resultant constituents, it will be apparent that the products are kept separate from each other, as well as from the solvent, and the water later separated from the turpentine and solvent, whereby pure products are obtained without the necessity of using a still auxiliary to the extractor and employing the process of distillation in the separation of the products, solvent and water of condensation from each other. As soon as the solvent is driven from the wood by the final admission of steam through the pipe 11, the wood is left moist, so that it will not burn until dried out, and at the same time is left in the most desirable state for the manufacture of wood pulp or its use as fuel, if desired.

In practising my method, any solvent in liquid form not having an acid or alkaline reaction may be employed, but I prefer to use a light hydrocarbon on account of economy, both in time and labor, a light hydrocarbon being preferable to a heavy hydrocarbon, on account of its low boiling point, greater penetrative and solvent effect, and its freedom from impurities. The heavier hydrocarbons have no economical value on account of low first cost, as they leave a paraffin deposit in the resin, which makes this product undesirable, and which cannot be removed without lessening the value of the resin, while at the same time such deposit in the resin diminishes the supply of solvent, making a heavy hydrocarbon solvent more expensive even at a low initial cost than a hydrocarbon of a lighter grade.

The process above described and as illustrated assumes, for convenience, that but one extractor is to be employed for use. In practice, however, any number of extractors may be employed with a comparative degree of economy in labor and with equal success.

A desired and important value of my improved process resides in the fact that it dispenses entirely with the use of a distilling apparatus and process in addition to the extractor, thus decreasing the cost of the plant and the process of operation, while at the same time enabling the process to be efficiently carried out by attendants of ordinary intelligence. Furthermore the simplicity of the apparatus, and the elimination of technical and expensive steps, adapts the process to be employed through the use of small plants, capable of being cheaply manufactured for utilizing the waste wood from saw-mills, etc., so that the turpentine and resin may be obtained from ordinary refuse matter.

Having thus fully described the invention what is claimed is:

The herein-described process of distilling wood, which consists in treating the wood in a suitable receptacle to the direct action of saturated steam substantially without pressure within the receptacle and of such a low boiler temperature and pressure as will drive off the turpentine but will not distil out the pine oils contained in the wood, then continuing to directly subject the wood to the action of saturated steam while superheating the bottom of the receptacle by heat applied externally of the distillation chamber to retard condensation of the steam and evaporate the condensate, then condensing the vapors and separating the turpentine from the water of condensation, then subjecting the wood to the direct action of superheated steam to distil out the pine oils, then condensing the vapors and separating the pine oils from the water of condensation and collecting such oils separate from the turpentine, then treating the wood by percolation to the leaching action of a neutral volatile solvent to dissolve out the rosin, then bringing the draining solvent from the wood into contact with the superheated surface to evaporate the drained solvent and free the rosin therefrom, then subjecting the wood to the action of steam to drive off the remainder of the solvent, collecting and recovering the solvent from the water of condensation, and then drawing off the rosin.

In testimony whereof I affix my signature in presence of two witnesses.

JOHN H. CASTONA.

Witnesses:
WILLIAM E. THOMAS,
FRANK LINDNER.